INVENTOR.

Francis V. Adams

INVENTOR.

Francis V. Adams

Jan. 17, 1961 F. V. ADAMS 2,968,792

COMPACTED WORD STORAGE SYSTEM

Filed Nov. 24, 1954

3 Sheets-Sheet 3

INVENTOR.

Francis V. Adams 2,968,792

COMPACTED WORD STORAGE SYSTEM

Francis V. Adams, Endicott, N.Y., assignor to International Business Machines Corporation, New York, N.Y., a corporation of New York Filed Nov. 24, 1954, Ser. No. 470,882

19 Claims. (Cl. 340—172.5)

The present invention relates to message or data storage systems and, more particularly, to such systems wherein a plurality of messages or a quantity of data is stored in successive order. While the invention is of general utility, it has particular utility in systems employing magnetic storage media and will be described in that environment.

There are numerous applications, such as computing and recording, where it is desirable to store certain information for various periods of time in order that the information may be available for later use. This has heretofore been accomplished by the use of magnetic storage media, conveniently in the form of plural magnetic storage tracks positioned side by side on the periphery of a rotatable drum. Frequently the information is supplied in message intervals and a predetermined number of intervals may be accommodated on each storage track, the tracks being stored to capacity in succession. In many applications, the information occurring during each message interval does not always fill the interval and more often is of random length having any value from a fraction of the interval to the full interval. It is apparent that stoarge of such information using message lengths is inefficient and wasteful of the full available storage capacity of the storage media.

It has been proposed that the important disadvantage last mentioned be avoided by so controlling the storage transfer that fresh storage media is presented so long as information is available for storage but presentation is stopped upon lack of such information. These stop-and-go systems usually involve moving mechanical components having appreciable inertia which makes an immediate stop exceedingly difficult to attain in practice. These arrangements thus also have a tendency to be wasteful of storage capacity by virtue of undesirable gaps between successive stored messages.

It is an object of the present invention to provide a new and improved system for continuously storing messages of variable length and one which avoids one or more of the disadvantages and limitations of prior storage systems.

It is a further object of the invention to provide a system for storing successive messages wherein maximum use is made of the available storage capacity of the storage media, and thus one characterized by high storage efficiency.

It is an additional object of the invention to provide a novel message storage system wherein the beginning of the information content of one message is stored as a continuation of the information content of a preceding message, yet one in which the discrete beginning and end of each message is faithfully preserved and clearly identified.

A message storage system embodying the invention measures the length of each message to be stored, translates successive messages to the storage media for storage, adds to the end of the information content of each message a marker indicia, and so uses these marker indicia during translation of successive messages that the marker indicia signifying the end of one message effectively becomes the marker indicating the beginning of the next when the messages are stored by the storage media. Since practical storage media have finite storage capacity, the storage system of the invention predetermines prior to the storage of each message that the message will not cause the storage media to exceed its storage capacity and thereby be unable to store all of the message. In the latter event, the system automatically transfers such message and those succeeding it to a new storage media for storage.

A specific embodiment of the invention is described below and illustrated in the drawings, in which.

Figure 4:
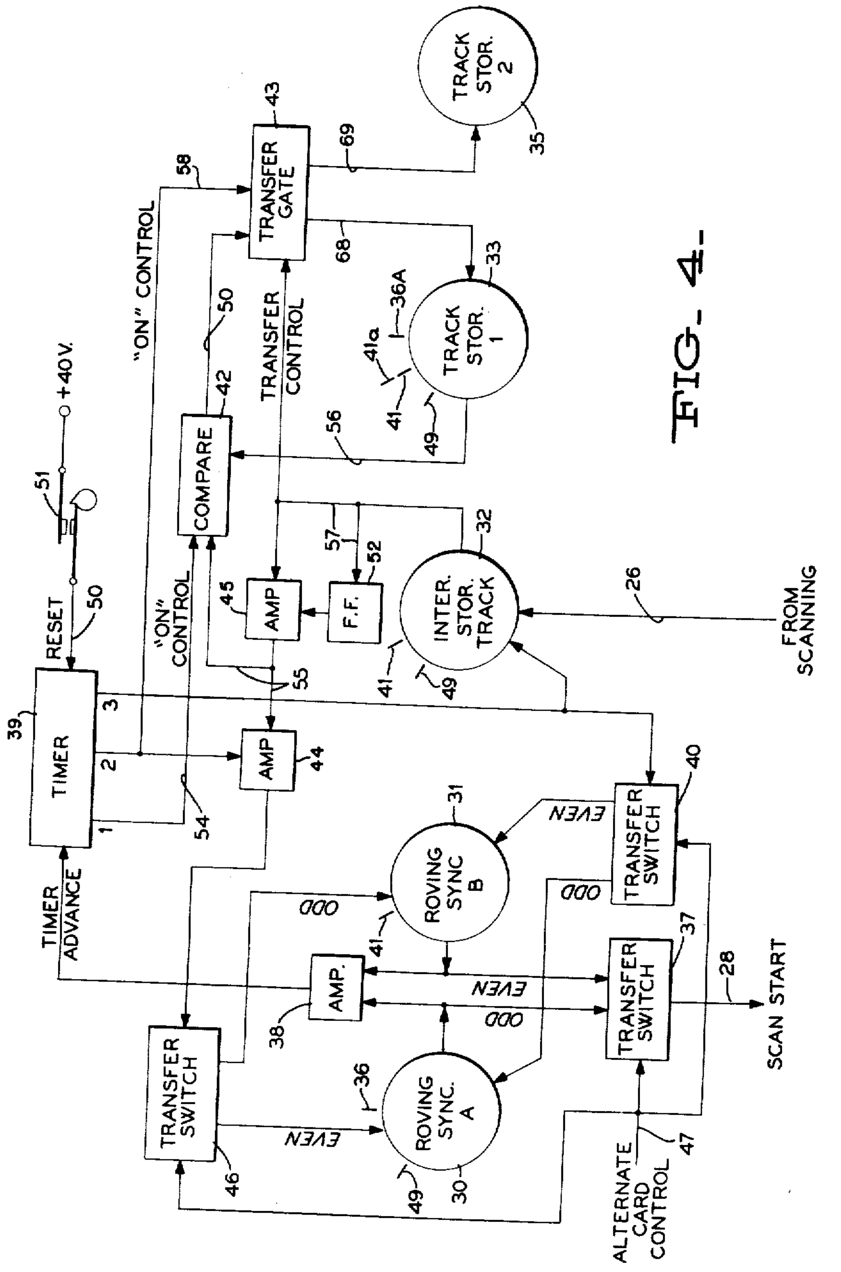

Fig. 4 schematically represents the message storage system; and

Figure 5:
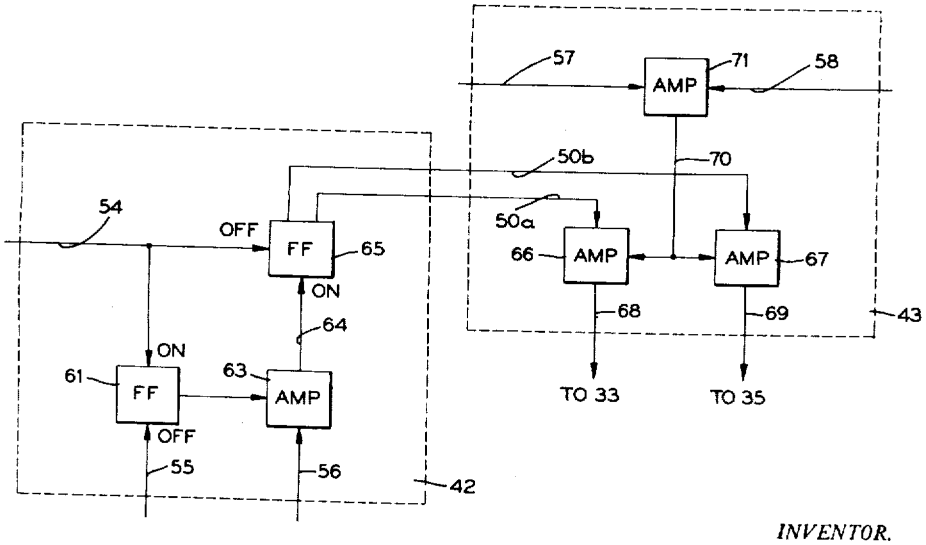

Fig. 5 is a schematic showing the construction of certain units employed in the Fig. 4 arrangement.

Figure 1:
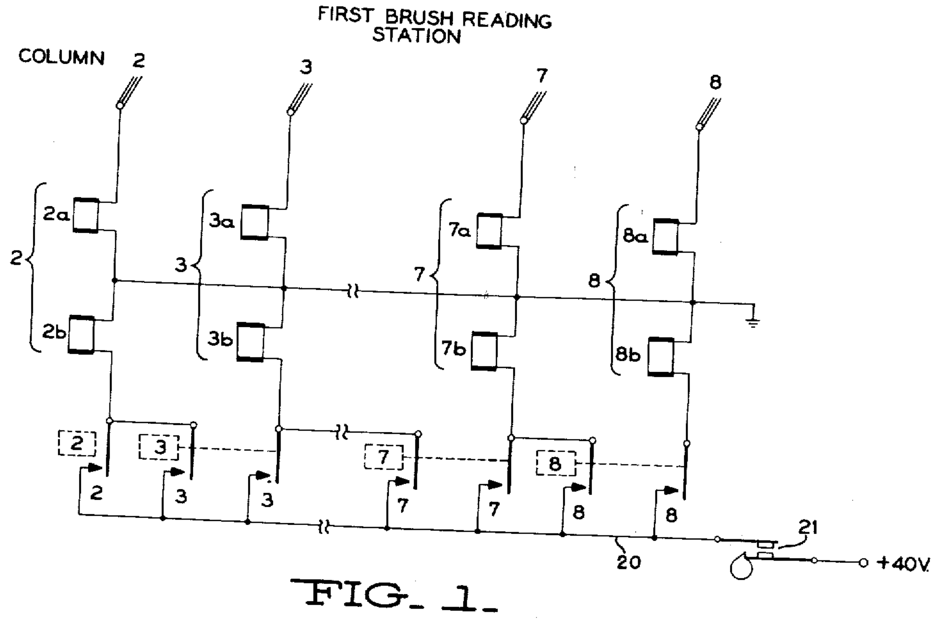
Fig. 1 is a schematic showing the system of relays associated with the first reading or exploration station.

Referring now more particularly to Fig. 1, the relay system there shown includes a plurality of relays 2–8 in a system suitable for reading an 8 character message field. In this figure and those to be later described, the the contacts of each relay are shown in the non-actuated position of the relay. There is associated with each relay a winding 2*a*, 3*a*, etc. which is connected to an associated brush of the first reading or exploring station of conventional arrangement, such as shown in United States Patent No. 2,672,283 granted to Byron L. Havens, used for example to read punched cards conveying the message information to be stored. Each of these relays also includes a second winding 2*b*, 3*b*, etc. which is coupled through an associated hold contact activated by that relay, or by hold contacts activated by the immediately following relay, to a conductor 20 which is periodically energized through a cam-actuated contact 21 from a source of potential, indicated as +40 v. In the arrangement shown, it will be apparent that should relay 2 not be energized by a punched hole in the card being read it will not be energized to close its hold contacts, but actuation of relay 3 by virtue of a punched card hole will close not only the hold contacts of relay 3 but in addition a hold contact for relay 2. Thus the last relay actuated by a punched hole in the read card will serve through its hold contacts and those of preceding relays to energize its hold winding and those of all preceding relays. This actuation accordingly totalizes the number of characters in any given message including both the indicated characters and also the spaces between indicated characters.

Figure 2:
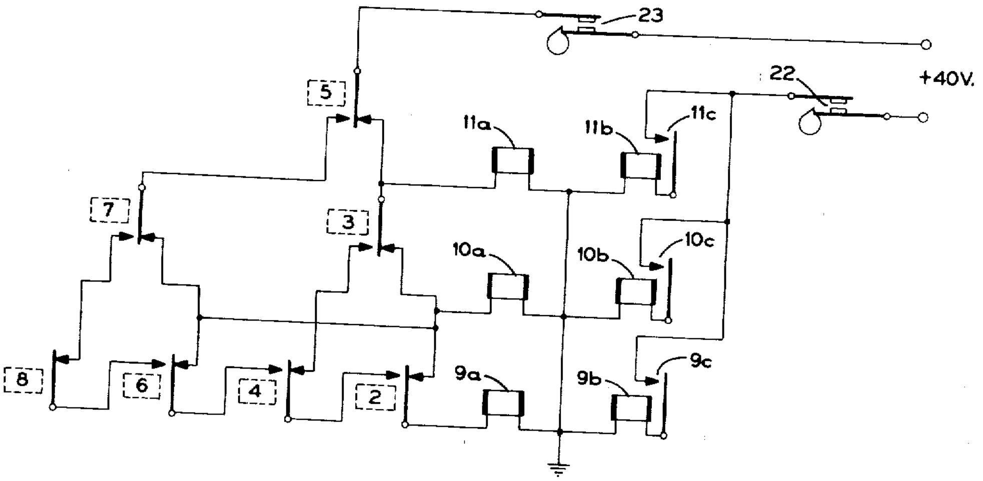
Fig. 2 is a schematic showing a relay system which is controlled by the Fig. 1 system in order to provide message character totalization.

The relay system of Fig. 2 includes three relays 9, 10 and 11 having actuating windings 9*a*, 10*a* and 11*a*, respectively, and hold windings 9*b*, 10*b* and 11*b* which are energized through associated hold contacts 9*c*, 10*c* and 11*c* and through cam-actuated contacts 22 from a source of potential +40 v. The operating windings of the relays 9, 10 and 11 are energized through contacts operated by the several relays of the Fig. 1 system and identified by numerals corresponding to the numeral associated with an individual relay in Fig. 1. Thus when none of the relays of Fig. 1 are actuated, relay contacts 2, 3 and 5 are closed to energize relay windings 9*a*, 10*a* and 11*a* upon closure of a cam-actuated contact 23 connected to a source of energizing potential +40 v. Assume now by way of illustration that relay 2 is energized to actuate its contact 2 shown in Fig. 2. This leaves relay windings 10a and 11a energized through relay contacts 3 and 5 but de-energizes the relay winding 9a. It can similarly be shown that if relays 2 and 3 in Fig. 1 are energized, thus to actuate the relay contacts 2 and 3 of Fig. 2, relay winding 11a remains energized through relay contact 5 and relay winding 9a remains energized through relay contacts 2, 3, 4 and 5 but relay winding 10a becomes de-energized by actuation of the relay contacts 2 and 3 to their actuated position. Similar analysis will show that actuation of the Fig. 1 relays in succession results in actuation of the relays 9, 10 and 11 either alone as individual relays or in various relay combinations. The reason for this mode of relay operation will become apparent upon consideration of the Fig. 3 arrangement, but before turning to the latter it should be pointed out that the cam-actuated contacts 22 and 23 of Fig. 2 close after the end of the exploratory period of the Fig. 1 arrangement. After contacts 22 and 23 close and relays 9, 10 and 11 have been energized, cam contacts 21 are opened to prepare the Fig. 1 system for a subsequent exploratory operation on another card.

Figure 3:
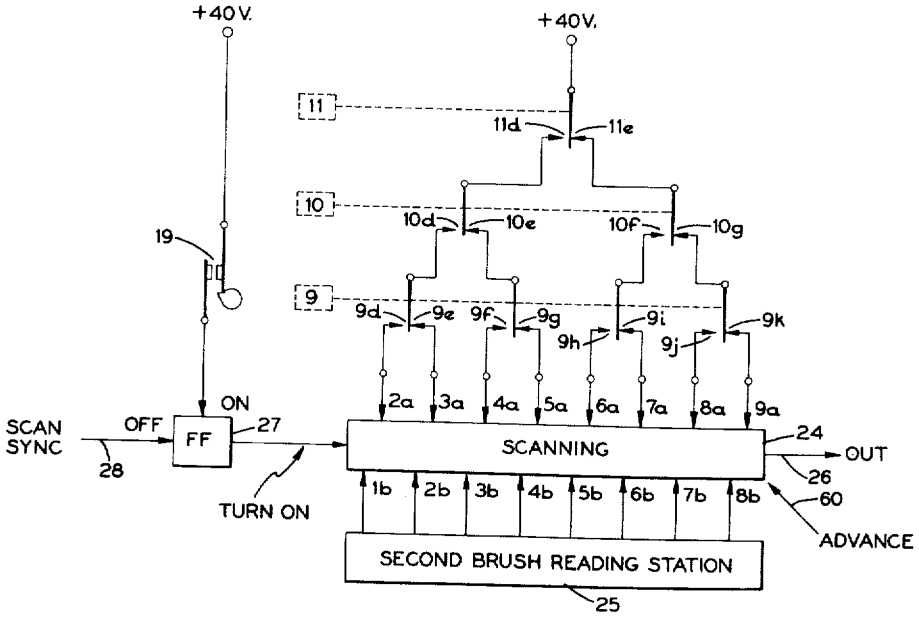
Fig. 3 is a schematic showing a relay system controlled by the Fig. 2 system and providing a properly positioned message termination mark indicative of the termination of the massage information, and further illustrates the operative relationship of this relay system with the second reading station.

Referring now to Fig. 3, the relays 9, 10 and 11 of the Fig. 2 relay system are indicated in the present figure as having a plurality of relay contacts interconnected as shown in the drawing. That is, relay 9 includes four pairs of contacts identified as 9d–9k, relay 10 includes two pairs of contacts 10d–10g and relay 11 includes one pair of contacts 11d–11e. The movable contact of relay 11 associated with its fixed contacts 11d–11e, is connected to a source of potential +40 v. This applies a marker voltage through the relay contact arrangement of relays 9, 10 and 11 to an individual one of the leads 2a–9a of the scanning unit 24. The latter unit may, for example, take the form shown as Fig. 3–7 of "High Speed Computing Devices" by Engineering Research Associates (copyright 1950) in which the individual ring flip-flop units control the gain of individual amplifiers provided in unit 24, the amplifiers having a common output circuit 26 and an individual input circuit coupled to an individual one of the circuits 2a–9a and 1b–8b of a second card reading station 25. A flip-flop unit 27 which precedes the scanning unit 24 can be considered as the first flip-flop unit of the ring, and there is applied in common to the remaining flip-flop units of the ring advance pulses from a control circuit 60 to which are applied advance pulses from a timing track moving in unison with a plurality of information storage tracks described below. The construction and arrangement of this timing track is more fully described in copending application Ser. No. 464,516, filed October 25, 1954, in the names of Francis E. Hamilton et al., and assigned to the same assignee as the present application. The character totalization effected by the Fig. 1 relay system when transferred through the Fig. 2 relay system causes a marker voltage to be applied to an individual one of the input leads 2a–9a of unit 24 depending upon the total number of characters and character spaces in the message read at the first reading station. In doing so, all of the hold circuits of the Fig. 2 relays are maintained closed during the operation of the second reading station.

In order that this positioning of the termination marker pulse, to indicate termination of the character message, may be more readily understood it will be helpful to consider a specific example. Suppose that the relay system of Fig. 1 shows a total of seven characters and character spaces in the message thus to result in energization of relays 2 through 7. This means that all of the relay contacts 2 through 7 in Fig. 2 have been actuated with the result that relay 9 is energized through contacts 2, 4, 6, 8, 7, 5 and 23 from the source +40 v. Relays 10 and 11 are de-energized since the relay contacts 2, 3, 4, 6 and 7 to which they are connected are opened.

With relay 9 energized as last mentioned, the marker voltage in Fig. 3 is applied through contacts 11e, 10g and 9j to the lead 8a of unit 24 thus to place the marker in the interval immediately following the seventh character position of the read message. Had there been eight characters in the read message at station 1, relay 8 would have been actuated thus to open its contact 8 in Fig. 2 to leave all of the relays 9, 10 and 11 de-energized and thereby apply the marker pulse to lead 9a of the unit 24. Thus it will be seen that the marker pulse by operation of the relay systems described is always inserted on one of the leads 2a–9a of unit 24 immediately following the totalized character count effected at the first reading station.

Fig. 3 also shows a second brush reading station 25 of conventional construction like that referred to above in connection with Fig. 1. The brush contacts of the reading station 25 are also connected to the scanning unit 24 which operates to scan all of the leads 1b–8b and 2a–9a by the process of scanning alternate ones of the last mentioned groups of leads in succession; that is, by scanning lead 1b, 2a, 2b, 3a, 3b, 4a, etc., in that order. The output circuit 26 of the scanning unit 24 thus is a signal representing the total number of characters and character spacings read at the second reading station immediately followed by a termination marker pulse indicative of the last read character.

The operation of the scanning unit 24 is initiated by a negative pulse potential applied to its initiating circuit through the flip-flop form of multivibrator 27. The latter is turned on by a positive potential applied through cam actuated contacts 19 from a source of potential +40 v., and is turned off to generate a negative polarity output pulse by a signal pulse applied to the unit 27 over circuit 28 from the message storage system now to be described.

Fig. 4 represents the message storage system, and includes a plurality of magnetic storage tracks 30–35 which are rotated in synchronism and may be conveniently provided on the periphery of a motor driven drum. Tracks 30 and 31 may be referred to for convenience as roving sync track A and roving sync track B, respectively, for reasons which will shortly become apparent. One of these tracks has an initial marker pulse recorded at some point on its periphery. Assume that this is track 30 and that the marker pulse is identified by the numeral 36. As this track rotates, the marker pulse 36 passes under a conventional reading head and supplies a pulse both through a transfer switch 37 to the circuit 28 and also through a combining form of amplifier 38 to a timer unit 39. The amplifier 38 is conventional and includes two input circuits and a common output circuit. The transfer switch 37 includes two amplifier stages having a common output circuit 28 but individual input circuits, the stages being alternately rendered operative under control of a flip-flop multivibrator in unit 37 controlled in turn by the pulses applied thereto from a card control circuit 47, the function of which will become apparent hereinafter. The control circuit 47 is also coupled to a transfer switch 40 and a similar transfer switch 46, the switches 40 and 46 being similar in construction to the switch 37 except that their amplifier stages have a common input circuit and individual output circuits. The timer unit 39 may, for example, have a ring of flip-flop units as in the unit 24 described above, cathode followers being included in unit 39 between each of the several timer output circuits and the output circuit of an individual flip-flop multivibrator of the ring for purposes of lowering the voltage output level of the timer to suitable values. Additionally the timer is controlled by a reset circuit 50 energized through cam-actuated contacts 51 from a potential source +40v. This reset circuit is connected to the first stage of the timer ring to render that stage in the ON condition. The latter condition will be herein considered as the zero position of the timer. The cam contacts 51 make contact all during the card reading time and until sufficient time has elapsed to permit completion of scanning by the unit 24. This elapsed time will never exceed two revolutions of the several storage tracks 30–35. The pulse input applied to the timer from the amplifier 38 advances the timer from its zero or reset position, assuming that cam contacts 51 have opened, to its number 1 timing position and succeeding pulses thereafter advance the timer successively to the number 2 and 3 timing positions.

The pulse applied to the circuit 28 initiates the operation of the message scanning system of Fig. 3 as earlier explained and the message read out at conductor 26 is applied to the intermediate storage track 32. The end of the read out message is identified by a termination marker pulse 41 added by the scanning unit 26 as previously described, and the read out message is accordingly stored on the track 32 just ahead of the marker pulse 41. This initial storage occurs during the first complete rotation of the tracks 30–35 following the application of a pulse to the circuit 28 and thus during the first timing interval of the timer 39.

During the second timing interval of unit 39, a control pulse is applied from the timer through a control circuit 54 to a comparator unit 42, described more fully hereinafter in connection with Fig. 5, which also has applied to it through a circuit 56 any previous stored messages on a storage track 33. If the comparator 42 does not receive any markers or characters from the track 33 during the interval after it has been turned on by the timer 39 and before it is turned off by the terminal marker 41 translated to it from the track 32 through a gated amplifier 45 and the latter's output circuit 55, it applies a distinctive potential through a control circuit 50 to a transfer gate 43 which is effective during time interval 2 of the timer 29 under control of the timer circuit 58 to translate the marker pulse 41 and its preceding message through the transfer gate 43 and an output circuit 68 to the storage track 33 where both the marker 41 and its preceding message are stored. At the same time, the timer 39 opens up a gated amplifier 44 which receives the termination marker pulse 41 of the intermediate storage track translated through the gated amplifier 45 and applies the translated pulse to the transfer switch 46. Since the marker pulse always follows the last character of the message, the former is readily separated from the message by applying the message and marker pulse to a one-shot multivibrator 52 which develops and applies to the amplifier 45 a gating pulse initiated at the termination of the character and ending just prior to the time of occurrence of any following character. The alternate card control circuit 47, to which is applied a pulse control potential initiated by alternate cards read at reading station 2, so controls the transfer switch 46 that the translated pulse from the unit 44 is applied to and recorded on track 31 as indicated by the marker 41 on this track.

During the third interval of the timer 39, an erase signal is applied from an erase source included in unit 39 to the intermediate storage track 32 to erase the marker pulse 41 and the preceding message and is also applied through the transfer switch 40 to erase the marker pulse 36 on the storage track 30. At the end of the third interval of timer 39, storage track 30 is left without any marker signals, storage track 31 is left with the marker pulse 41, intermediate storage track 32 is left without any stored marker pulse or message, and storage track 33 is left with the stored marker pulse 41 and the preceding message.

This completes the storing of the first message and conditions the system to receive and store a second message. The operation of the system in storing this second message is similar to that described in connection with the first stored message with one exception. All the relays in the Figs. 1, 2 and 3 systems having progressed through a cycle of operation to provide a termination marker pulse for the second message to be recorded, the pulse 41 of the track 31 is now translated through the transfer switch 37 (which has been conditioned for such transfer by the operation of the control circuit 47 under actuation by the second card to be read) and through the circuit 28 to the unit 27 which thereupon transmits an initiating pulse to the scanning unit 24. At the same time, the pulse 41 is translated through the mixing unit 38 to the timer 39 to advance its timing operation if the cam contacts 51 are open; otherwise the next application of the pulse to the timer will be the one which is effective to advance its timing. As before, a termination marker pulse 49 is received with the message from the output circuit 26 of the scanning unit 24 and is stored with the message on the intermediate storage track 32. The marker pulse 49 and its preceding stored message on the track 32 again is compared in unit 42 during the first timing interval with the stored information on track 33, and is recorded on track 33 if the comparison shows that the entire message with its terminating marker pulse can be received within the remaining available storage spaces of the track 33. In this, it will be noted that the timing of the pulse 41 is coincident with the storage of the termination marker 41 of the preceding message. Accordingly successive messages are stored on track 33 continuously and without intervening separations between messages, the information at the beginning of one message forming a continuation of the information at the end of the preceding message. It may be noted, however, that even though the successive messages are so stored with the information of one effectively continuing without interruption into the information of the second, the marker pulses between successive messages furnish message indicia which accurately preserves the individual identity of each stored message. After storage of the second message, the timer unit 39 again effects erasure of the message and marker pulse stored on the intermediate storage track 32 and effects erasure of the marker pulse 41 which had been stored on the track 31. In this regard, it may be noted that prior to erasure of the marker pulse 41 in the track 31, the act of transferring the marker pulse from the intermediate storage track 32 to the final storage track 33 also effected transfer of the marker pulse through the units 45, 44 and 46 to the synchronizing storage track 30 as indicated by the marker pulse 49 shown in association with the latter track. This stored marker pulse on track 30 initiates the operation of the system in reading and storing the third message.

It will be apparent that after a number of succeeding messages have been continuously stored in succession on the final storage track 33, the finite storage capacity of the latter will not permit reception of some final message temporarily stored on the intermediate storage track 32 and this fact will be indicated by the comparator unit 42 which will then receive information from the storage track 33 during some portion of the message temporarily stored on track 32. When this occurs, the comparator 42 develops a distinctive output control potential which is applied through the control circuit 50 to the transfer gate 43. The latter thereupon operates to translate this massage and succeeding messages from the intermediate storage track 32 through an output circuit 69 to the second storage track 35. While only two final storage tracks 33 and 35 have been shown for purposes of simplicity, in practice storage tracks of the order of several hundred or more will be used in a particular application.

The construction of the comparator unit 42 and transfer gate 43 is shown in greater detail in Fig. 5. Unit 42 includes a conventional flip-flop multivibrator 61 having one input control circuit to which the control circuit 54 is connected and a second input control circuit coupled to the circuit 55. The unit 61 develops an output gating potential which is applied through gating control circuit 62 to gate an amplifier 63 on and off with unit 61 as the latter is turned on by the timing signal from the timer 39 and is turned off by the marker pulse from amplifier 45. The amplifier 63 has an input circuit coupled through the circuit 56 to the reading or pick-up head of the storage track 33, and an output circuit 64 coupled to an input control circuit of a flip-flop multivibrator unit 65. The latter has a second input control circuit coupled to the control circuit 54 of the timer 39, and has two output circuits 50*a* and 50*b* which are coupled to gain control circuits of respective amplifiers 66 and 67 included in the transfer gate unit 43. These amplifiers have individual output circuits 68 and 69, but have their input circuits coupled in common to the output circuit 70 of an amplifier 71. The input circuit of the latter amplifier is coupled to the circuit 57 from the reading head of the intermediate storage track 32, and the amplifier includes a gain control circuit to which the timer control circuit 58 is coupled.

Considering now the operation of the arrangement last described, the flip-flop unit 61 is turned on by the timer 39 at the outset of the first timing interval and remains on until a marker pulse is applied through the circuit 55 from the amplifier 45. During this On interval, the amplifier 63 is likewise turned on and translates to the flip-flop unit 65 any stored messages or markers picked up by the pick-up head of storage track 33. If, during the On time of the amplifier 63 no recorded information is received from the storage track 33, indicating that the latter yet has sufficient storage space within which to store the message at that time temporarily stored on track 32, no signal is translated to the amplifier output circuit 64 to change the condition of the flip-flop unit 65. In this state of affairs the amplifiers 71 and 66 during the next timing interval translate the message and marker pulse temporarily stored on track 32 to the storage track 33. If, however, the amplifier 63 during its On period does receive stored information from the storage track 33 to indicate that the latter has insufficient remaining storage space to receive the temporarily stored message, the received information is translated to the amplifier output circuit 64 and is effective to turn on the flip-flop unit 65. The resulting control potentials developed in the flip-flop output circuits 50*a* and 50*b* are then effective to turn the amplifier 67 on and turn the amplifier 66 off. Thereafter a temporarily stored message and marker pulse on storage track 32 is translated during the next timing interval through the amplifiers 71 and 67 to the storage track 35 for storage.

It will be apparent from the foregoing description of the invention that a continuous storage system embodying the invention has the important advantage that each individual message to be stored is measured as to length, is identified by terminating marker indicia, and is stored in a storage media by use of the storage capacity of the latter to the fullest extent. The system is thus characterized by maximum usage at high efficiency of the storage media with its inherent finite storage capacity. It will further be apparent that a system embodying the invention is capable of very high rapidity of operation with large message storage ability and high accuracy of message storage.

I claim:

1. A system for continuously storing messages of variable lengths comprising, temporary storage means for receiving and storing each successive message in entirety, means responsive to the total message content of each message received by said temporary storage means for measuring the length of said each message, final storage means, and means controlled by the message length measurement effected by said measuring means for controlling the positional translation of each message from said temporary storage means to said final storage means to store successive said messages in said final storage means in continuous relation in storage and without interval therebetween.

2. A system for continuously storing messages which may differ in lengths comprising, input storage means for temporarily storing in entirety each new message, final storage means, means for totalizing for each new message the message characters and character spacings contained therein, and means responsive to an output control effect produced by said totalizing means as indicative of the end of each message for controlling the transfer of said each message from said input storage means to said final storage means to effect storage of successive said messages in continuous relation in said final storage means and without interval between the end of one message and the beginning of the next.

3. A system for continuously storing messages which may be of random lengths within a mixmum predetermined length comprising, means for measuring the difference between the length of each message and said predetermined length, message storage means having a predetermined message storage capacity, and means controlled by the measured differences of said measuring means for storing said messages in continuous succession in said storage means while concurrently predetermining prior to each such storage that the immediate message to be stored does not cause said storage means to exceed said predetermined storage capacity.

4. A system for storing messages of random length comprising, message storage means having finite storage capacity, means for translating successive messages to said storage means in such manner that the information content at the end of one message forms a continuation of the information content beginning a succeeding message, and means included in said translating means for pre-establishing prior to the translation of each message that the message will not cause said storage means to exceed said finite capacity.

5. A message storage system comprising, first storage means having a finite storage capacity, second storage means operating in unison with said first storage means for receiving and temporarily storing each message in succession prior to storage in said first storage means, means for translating to said second storage means and thereafter to said first storage means successive messages to be stored, and means responsive jointly to the temporarily stored message of said first storage means and all of the stored messages of second storage means for predetermining that a message to be translated to said first storage means will not cause said first storage means to exceed said finite capacity by the next message offered for storage thereby.

6. A message storage system comprising, first storage means having a finite storage capacity, second storage means operating in unison with said first storage means for receiving and temporarily storing each message in succession prior to storage in said first storage means, means for comparing the length of each message temporarily stored in said second storage means with the remaining available storage space of said first storage means, and means controlled by said comparing means for translating said temporarily stored message to said first storage means whenever said comparison indicates available capacity in said first storage means to receive in its entirety said message temporarily stored.

7. A message storage system comprising, message storage means having at least two successive storage sections each of finite storage capacity, second storage means operating in unison with said first means for temporarily storing each message in succession prior to storage in said first means, means for comparing the length of said temporarily stored message with the unused storage capacity of the then used section of said first storage means, and means controlled by said comparing means for translating said temporarily stored message to the first of said successive sections of said first storage means which will receive said temporarily stored message in its entirety.

8. A message storage system comprising, first message storage means having a plurality of successive storage sections each of finite storage capacity, second storage means operating in unison with said first storage means for receiving and temporarily storing messages, time sequence control means, translating means operating under control of said time control means for translating to said second storage means during a first time interval a message for temporary storage thereby, and means operating under control of said timing means for comparing during a second time interval the length of said temporarily stored message with the remaining available storage capacity of the then used section of said first storage means for translating during a third time interval the temporarily stored message to the first available one of said successive storage sections which is capable of receiving said temporarily stored message in its entirety.

9. A message storage system comprising, first storage means having a finite storage capacity, second storage means for receiving and temporarily storing each message in succession prior to storage in said first storage means, means responsive to a comparison of the quantity of message information stored in both said first and second storage means at the completion of a temporary message storage for translating said temporarily stored message to said first storage means whenever said comparison indicates sufficient remaining available storage capacity to be available in said first storage means, and means for thereafter erasing the temporarily stored message in said second storage means to condition it for reception and storage of the next message to be stored.

10. A message storage system comprising, a plurality of closed ring magnetic storage media arranged in side by side relation and movable in unison, means responsive to the totalized message information previously stored in a first of said storage media for translating to a discrete preselected region of a second of said storage media for temporary storage thereby a message to be translated, and means for receiving said temporarily stored message for comparison with the information content stored in said first media and for thereafter translating said temporarily stored message to said first storage media whenever said comparison indicates that sufficient available storage capacity remains in said first storage media to receive said temporarily stored message in its entirety.

11. A system for translating messages of variable lengths comprising, means responsive to the entire concurrently presented contents of each new message for measuring and totalizing the quantity of characters and character spacings in each message, means responsive to said totalizing means for developing a control effect indicative of a message end, and means for translating said message serially by characters and character spacings and for combining therewith after the last character thereof said control effect.

12. A system for storing messages of variable lengths comprising, means responsive to the entire concurrently presented contents of each new message for measuring and totalizing the quantity of characters and character spacings in each message, means responsive to said totalizing means for developing a control effect indicative of a message end, means for translating said message serially by characters and character spacings and for combining therewith after the last character thereof said control effect, and means responsive to said control effect for initiating the operation of said last-mentioned means on the next succeeding message to be translated thereby.

13. A system for continuously storing messages of random length comprising, temporary storage means for receiving and storing each message in entirety, final message storage means, means responsive to the total message content of each message received by said temporary storage means for adding after the last character constituting the information content of each message an individual control effect, and means for utilizing the terminal control effect of a previously stored message to initiate the translation of a successive message from said temporary storage means to said final storage means to effect storage of successive messages in said final storage means free of inter-message overlap and without inter-message storage gap.

14. A system for storing messages of random lengths and times of occurrence comprising, initial storage means for receiving and temporarily storing in entirety each of successive messages having random times of arrival, final storage means, and means including intermediate storage means operationally responsive to the total information content of each message stored in said initial storage means for positionally controlling the translation of successive messages from said initial to said final storage means to effect storage of messages in said final storage means continuously in succession without positional interval between the information content at the end of one message and the information content beginning the succeeding message.

15. A system for storing messages of random lengths and times of occurrence comprising, initial storage means for receiving and temporarily storing messages having random times of arrival, final storage means, said initial storage means having with relation to said final storage means asynchronous operation for the reception and temporary storage of messages but having a synchronizable operation for translation of messages from storage, and means including intermediate storage means and means responsive to the terminal position in storage of the last message stored in said final storage means for synchronizing the message translation operation of said initial storage means positionally to control through said intermediate storage means the translation of messages from said initial storage means to said final storage means to effect final storage of messages therein in succession and with the information content at the end of one message continuing without interval into the information content of a succeeding message.

16. A system for storing messages of random times of occurrence comprising, initial storage means for receiving and temporarily storing messages having random times of arrival, intermediate storage means, final storage means, said initial storage means having a message storage operation asynchronous with relation to said intermediate storage means but said intermediate and final storage means operating to provide synchronized message translation to and from corresponding information storage positions therein, and translating means controlled by the terminal position in storage of a preceding message in said final storage means for controlling the translation of a succeeding message from said initial storage means to storage in said intermediate storage means at a selectable storage position therein such that upon subsequent translation of said succeeding message from said intermediate to said final storage means said preceding and succeeding messages are stored in succession in said final storage means without unused storage space therebetween.

17. A message storage system comprising, initial storage means for receiving and temporarily storing messages having random times of arrival, a plurality of closed ring magnetic storage media arranged in side by side relation and movable in unison to provide intermediate and final message storage, said initial storage means having with relation to the movement of said storage media asynchronous operation for the reception and temporary storage of messages but having a synchronizable operation for translation of messages from said storage, and means responsive to the terminal position in storage of the last message stored in one of said media for synchronizing the message translation operation of said initial storage means positionally to control through storage in the other of said magnetic media the translation of messages from initial to final storage to effect in said one storage media storage of messages therein in succession and with the information content at the end of one message continuing without interval into the information content of a succeeding message.

18. A system for continuously storing messages of random lengths comprising, means for receiving and temporarily storing each message and for adding thereto in storage a control effect indicative of the message end, intermediate storage means, means responsive to said control effect for translating each message in temporary storage in said initial storage means to positional temporary storage in said intermediate storage means, means including final storage means for translating each message in said intermediate storage means to said final storage means and for utilizing the control effect of each message to effect translation of the succeeding message from said initial storage means to storage in said intermediate storage means positionally different from the positional storage therein of the preceding message.

19. A message storage system comprising, first storage means having a finite storage capacity equivalent to a plurality of successively stored messages, second storage means for receiving and temporarily storing each message in succession prior to storage in said first storage means, means responsive to the total storage space occupied in said first storage means by messages previously stored therein for comparing the length of each message temporarily stored in said second storage means with the remaining available storage space of said first storage means, and means controlled by said comparing means for translating said temporarily stored message to said first storage means whenever said comparison indicates available capacity in said first storage means to receive in its entirety said message temporarily stored.

References Cited in the file of this patent

UNITED STATES PATENTS

| | | |
|---|---|---|
| 2,134,005 | Potts | Oct. 25, 1938 |
| 2,234,684 | Robinson et al. | Mar. 11, 1941 |
| 2,468,112 | Rosen | Apr. 26, 1949 |
| 2,522,758 | Lesigne | Sept. 19, 1950 |
| 2,609,439 | Marshall | Sept. 2, 1952 |
| 2,611,813 | Sharpless et al. | Sept. 23, 1952 |
| 2,614,169 | Cohen et al. | Oct. 14, 1952 |
| 2,679,638 | Bensky et al. | May 25, 1954 |
| 2,711,526 | Gloess | June 21, 1955 |
| 2,818,322 | Blakely | Dec. 31, 1957 |

UNITED STATES PATENT OFFICE

CERTIFICATION OF CORRECTION

Patent No. 2,968,792 January 17, 1961

Francis V. Adams

It is hereby certified that error appears in the above numbered patent requiring correction and that the said Letters Patent should read as corrected below.

Column 1, line 37, for "stoarge" read -- storage --; column 8, line 17, for "mixmum" read -- maximum --.

Signed and sealed this 13th day of June 1961.

(SEAL)
Attest:

ERNEST W. SWIDER
Attesting Officer

DAVID L. LADD
Commissioner of Patents